(12) United States Patent
Matsumura et al.

(10) Patent No.: US 10,210,720 B2
(45) Date of Patent: Feb. 19, 2019

(54) ELECTRONIC EQUIPMENT AND BEACON

(71) Applicant: FUJITSU LIMITED, Kawasaki-shi, Kanagawa (JP)

(72) Inventors: Takayoshi Matsumura, Yokohama (JP); Shunji Baba, Yokohama (JP); Takashi Kanda, Kawasaki (JP); Noritsugu Ozaki, Yokohama (JP); Hidehiko Kira, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/584,229

(22) Filed: May 2, 2017

(65) Prior Publication Data

US 2017/0345264 A1    Nov. 30, 2017

(30) Foreign Application Priority Data

May 31, 2016    (JP) ................. 2016-108677

(51) Int. Cl.
| | | |
|---|---|---|
| *F21S 9/03* | (2006.01) | |
| *G08B 5/22* | (2006.01) | |
| *H04W 4/029* | (2018.01) | |
| *H04W 4/80* | (2018.01) | |
| *H01L 31/048* | (2014.01) | |
| *G06K 19/073* | (2006.01) | |
| *G06K 19/077* | (2006.01) | |

(Continued)

(52) U.S. Cl.
CPC .......... *G08B 5/228* (2013.01); *G06K 19/073* (2013.01); *G06K 19/07749* (2013.01); *H01L 31/048* (2013.01); *H04W 4/029* (2018.02); *H04W 4/80* (2018.02); *F21S 9/037* (2013.01); *G12B 9/04* (2013.01); *H04W 12/12* (2013.01)

(58) Field of Classification Search
CPC combination set(s) only.
See application file for complete search history.

(56) References Cited

U.S. PATENT DOCUMENTS

| | | | |
|---|---|---|---|
| 5,898,370 A | * | 4/1999 | Reymond ............ G06K 19/073 340/539.1 |
| 6,050,622 A | | 4/2000 | Gustafson |

(Continued)

FOREIGN PATENT DOCUMENTS

| | | |
|---|---|---|
| JP | 2005-227818 A | 8/2005 |
| JP | 2014-160174 A | 9/2014 |

OTHER PUBLICATIONS

Nov. 7, 2017 Extended Search Report issued in European Patent Application No. 17169226.2.

*Primary Examiner* — Nabil H Syed
*Assistant Examiner* — Cal J Eustaquio
(74) *Attorney, Agent, or Firm* — Fujitsu Patent Center

(57) ABSTRACT

Electronic equipment includes: a substrate configured to include a first component, a second component, and an interconnection part that couples the first component with the second component by electric interconnections; and an exterior part configured to cover the first component, the second component, and the interconnection parts, and include a first exterior section that covers at least a portion of the first component, and a second exterior section that covers at least a portion of the interconnection parts, a thickness of the first exterior section being different from a thickness of the second exterior section to form a level difference in a boundary part between the first exterior section and the second exterior section.

12 Claims, 13 Drawing Sheets

(51) Int. Cl.
*G12B 9/04* (2006.01)
*H04W 12/12* (2009.01)

(56) References Cited

U.S. PATENT DOCUMENTS

| | | | |
|---|---|---|---|
| 2001/0008684 A1 | 7/2001 | Suzuki | |
| 2005/0031840 A1* | 2/2005 | Swift | D04H 3/07 428/292.1 |
| 2006/0273179 A1 | 12/2006 | Yamakage et al. | |
| 2008/0252425 A1* | 10/2008 | Okegawa | G06K 19/07749 340/10.1 |
| 2012/0012659 A1* | 1/2012 | Sugimoto | E05B 19/046 235/492 |

* cited by examiner

ELECTRONIC EQUIPMENT AND BEACON

CROSS-REFERENCE TO RELATED APPLICATION

This application is based upon and claims the benefit of priority of the prior Japanese Patent Application No. 2016-108677, filed on May 31, 2016, the entire contents of which are incorporated herein by reference.

FIELD

The embodiments discussed herein are related to electronic equipment and a beacon.

BACKGROUND

Beacons are wireless communication equipment that is also called radio beacons and that transmits information (beacon signals) which may be received by receiving devices. The beacons are used in such facilities as railroad stations and malls. The receiving devices that are in communication ranges for the beacons are capable of receiving the information wirelessly. Thus such services as guidance to destinations, such as ticket gates in railroad stations and stores, and information distribution for stores may be provided to users who have the receiving devices.

Beacons that are flexible and that may be installed in any locations may be provided by use of elastomer as material of the beacons. Silicone rubber that is an example of elastomer has high weather resistance, for instance. Further, maintenance-free beacons may be provided by use of solar cells as power sources for the beacons. Utilization of such weather-resistant and maintenance-free features makes it possible to use the beacons without detachment thereof after installation of the beacons until ends of lives thereof.

Japanese Laid-open Patent Publication Nos. 2005-227818 and 2014-160174 are examples of related art.

SUMMARY

According to an aspect of the invention, electronic equipment includes a substrate configured to include a first component, a second component, and an interconnection part that couples the first component with the second component by electric interconnections; and an exterior part configured to cover the first component, the second component, and the interconnection parts, and configured to include a first exterior section that covers at least a portion of the first component, and a second exterior section that covers at least a portion of the interconnection parts, a thickness of the first exterior section being different from a thickness of the second exterior section to form a level difference in a boundary part between the first exterior section and the second exterior section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

There have been apprehensions about theft of beacons, tampering with installation locations of the beacons, and the like. In order to deter the theft of beacons, the tampering with the installation locations of the beacons, and the like, it is demanded that the beacons are broken when being detached from the installation locations.

The embodiments discussed herein have been provided in consideration of above problems and are intended for providing electronic equipment that is easy to break.

Hereinbelow, embodiments will be described in detail with reference to the drawings. Configurations of the embodiments below are exemplary and the present disclosure is not limited by the embodiments disclosed herein.

<First Embodiment>

Figure 1A:
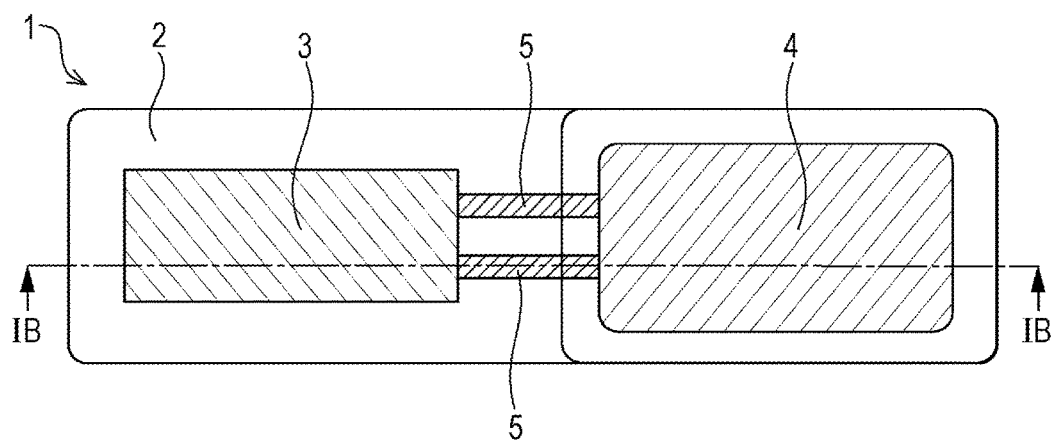
FIG. 1A is a plan view of a beacon.
Figure 1B:
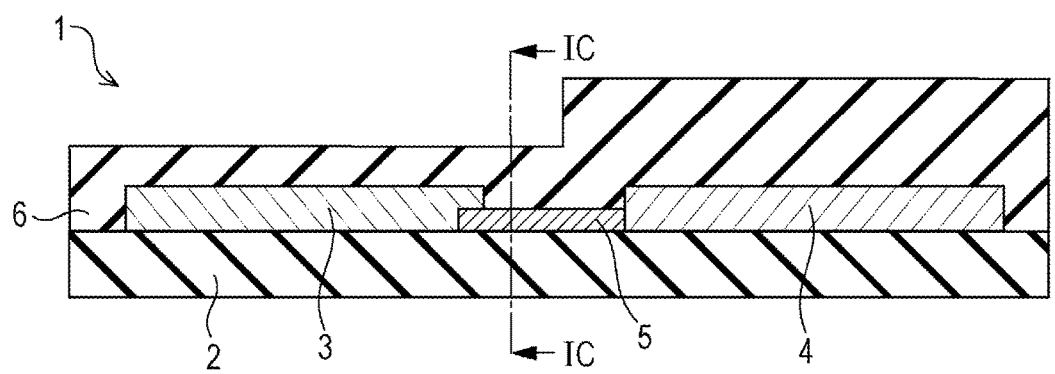
FIG. 1B is a sectional view of the beacon.
Figure 1C:
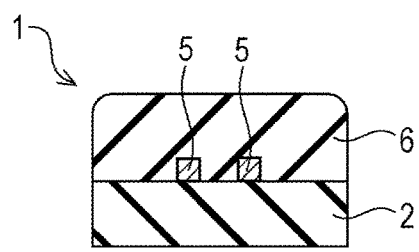
FIG. 1C is a sectional view of the beacon.

The first embodiment will be described below. FIG. 1A is a plan view of a beacon 1. FIG. 1B is a sectional view of the beacon 1 and illustrates a section taken along a long dashed short dashed line IB-IB in FIG. 1A. FIG. 1C is a sectional view of the beacon 1 and illustrates a section taken along a long dashed short dashed line IC-IC in FIG. 1B. The beacon 1 is wireless communication equipment that transmits beacon signals. The beacon 1 is an example of the electronic equipment. The beacon 1 includes a substrate 2, electronic components 3 and 4 that are mounted on or above a top surface of the substrate 2, interconnection parts (interconnection pattern) 5 that are placed between the electronic components 3 and 4, and an exterior member 6 that covers the substrate 2, the electronic components 3 and 4, and the interconnection parts 5. The electronic component 3 is an example of the first component. The electronic component 4 is an example of the second component. The exterior member 6 is an example of the exterior part. Material of the substrate 2 and the exterior member 6 is elastomer. As examples of elastomer, silicone rubber, fluorocarbon rubber, urethane rubber, acrylic rubber, butyl rubber, butadiene rubber, chloroprene rubber, natural rubber, and the like may be enumerated. The use of elastomer as the material of the substrate 2 and the exterior member 6 allows the beacon 1 flexible and to be installed in various places.

The electronic component 3 and the electronic component 4 are mounted in a mutually separated state on the substrate 2. The electronic component 3 supplies electric power to the electronic component 4. The electronic component 3 may be a power production source such as a solar cell or may be a power source such as a primary battery and a secondary battery. The electronic component 4 includes an antenna, interconnections, a controller, and the like. The electronic component 4 may be an electronic module that includes the antenna, the interconnections, the controller, and the like. The controller is an integrated circuit (IC) chip, a large-scale integration (LSI) chip, or the like, for instance. The electronic component 4 is driven by being supplied with the electric power from the electronic component 3 and transmits the beacon signals via the antenna.

The interconnection parts 5 link the electronic component 3 and the electronic component 4 by electric interconnections. The electric power is supplied from the electronic component 3 through the interconnection parts 5 to the electronic component 4. The interconnection parts 5 may be provided on or above the substrate 2 by formation of elastomer-based conductive paste on the substrate 2. The conductive paste is a mixture of metal particles and resin material. As examples of the metal particles, copper (Cu), gold (Au), silver (Ag), palladium (Pd), nickel (Ni), tin (Sn), and the like may be enumerated. As examples of the resin material, epoxy resin, polyimide resin, and the like may be enumerated. The interconnection parts 5 may be provided on or above the substrate 2 by formation of copper foil on or above the substrate 2.

Figure 2A:
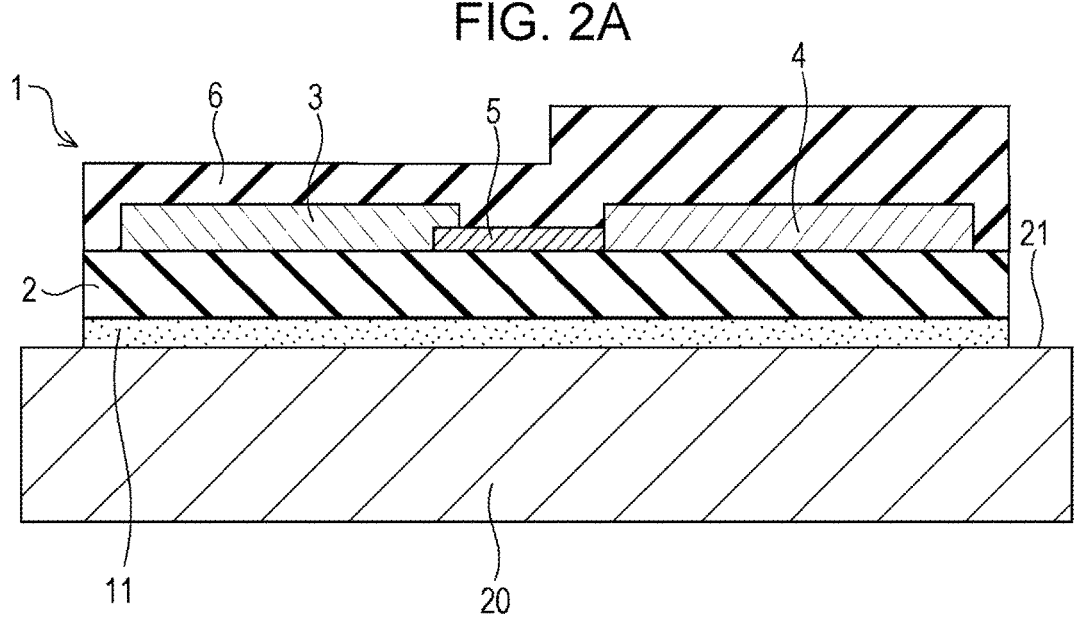
FIG. 2A is a diagram illustrating an example of a method of using the beacon.
Figure 2B:
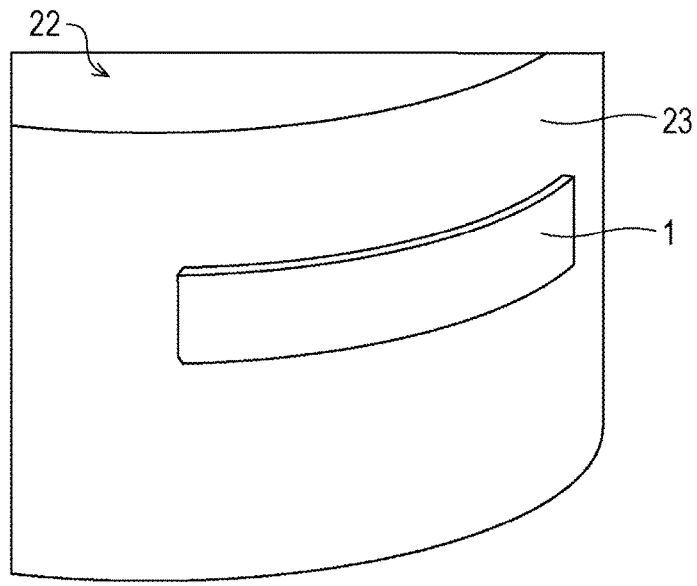
FIG. 2B is a diagram illustrating an example of a method of using the beacon.
Figure 2C:
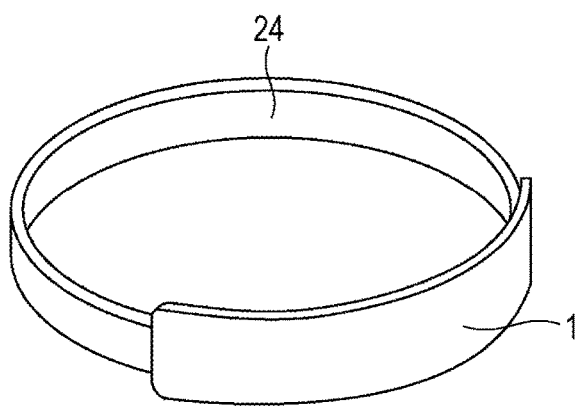
FIG. 2C is a diagram illustrating an example of a method of using the beacon.

FIGS. 2A to 2C are diagrams each illustrating an example of a method of using the beacon 1. As illustrated in FIG. 2A, the beacon 1 is affixed through a fixation member 11 onto a flat surface 21 of an object 20. The fixation member 11 is a bonding agent, a pressure sensitive adhesive, or an adhesive compound for instance. The beacon 1 may be fixed to the object 20 by bonding between the substrate 2 and the object 20 through the fixation member 11. The beacon 1 may be fixed to the object 20 by bonding between the exterior member 6 and the object 20 through the fixation member 11. The beacon 1 may be fixed to the object 20 by bonding between the substrate 2 and the object 20 through the fixation member 11 and by bonding between the exterior member 6 and the object 20 through the fixation member 11.

As illustrated in FIG. 2B, the beacon 1 is affixed through the fixation member 11 onto a curved surface 23 of an object 22. The beacon 1 may be affixed onto the curved surface 23 of the object 22 because the beacon 1 has flexibility. As illustrated in FIG. 2C, the beacon 1 is affixed through the fixation member 11 onto a band 24. The beacon 1 may be applied to wearable devices by being affixed onto the band 24. A wearable device on which the beacon 1 is affixed may be mounted on an object. The beacon 1 may be affixed onto flexible material such as fabric.

Figure 3A:
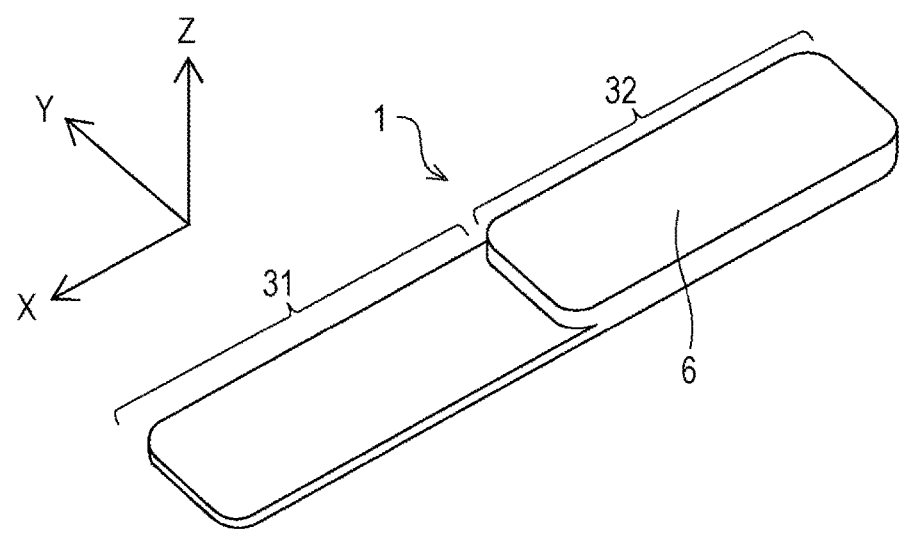
FIG. 3A is a perspective view of the beacon.
Figure 3B:
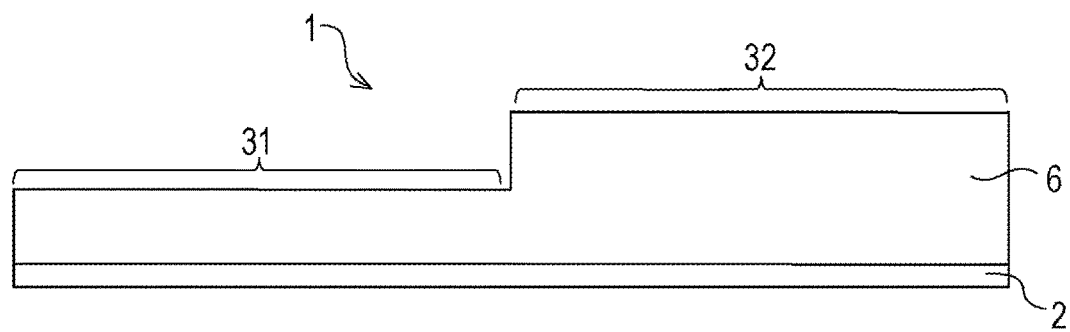
FIG. 3B is a side view of the beacon.

FIG. 3A is a perspective view of the beacon 1 and FIG. 3B is a side view of the beacon 1. The exterior member 6 includes a first exterior section 31 and a second exterior section 32. A thickness of the first exterior section 31 is different from a thickness of the second exterior section 32 and the thickness of the second exterior section 32 is greater than the thickness of the first exterior section 31. Therefore, a level difference is formed in a boundary part between the first exterior section 31 and the second exterior section 32. A stiffness of the first exterior section 31, where the stiffness is obtained by Young's modulus multiplied by cross-sectional area for the first exterior section 31, is smaller than a stiffness of the second exterior section 32 which is obtained by Young's modulus multiplied by cross-sectional area for the second exterior section 32. The stiffness of the first exterior section 31 is relatively small and thus the first exterior section 31 is more prone to be deformed than the second exterior section 32. The stiffness of the second exterior section 32 is relatively large and thus the second exterior section 32 is more resistant to deformation than the first exterior section 31.

Figure 4A:
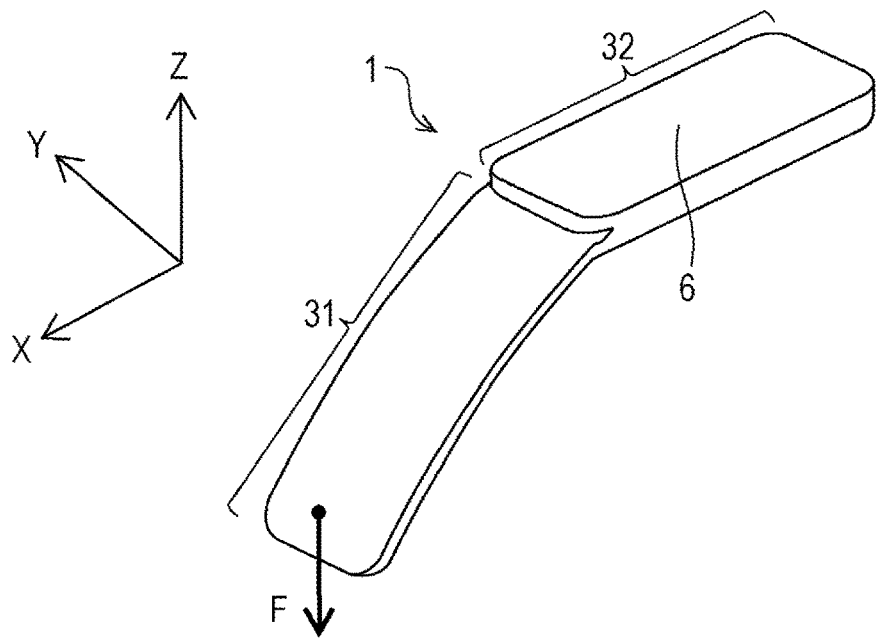
FIG. 4A is a perspective view of the beacon.
Figure 4B:
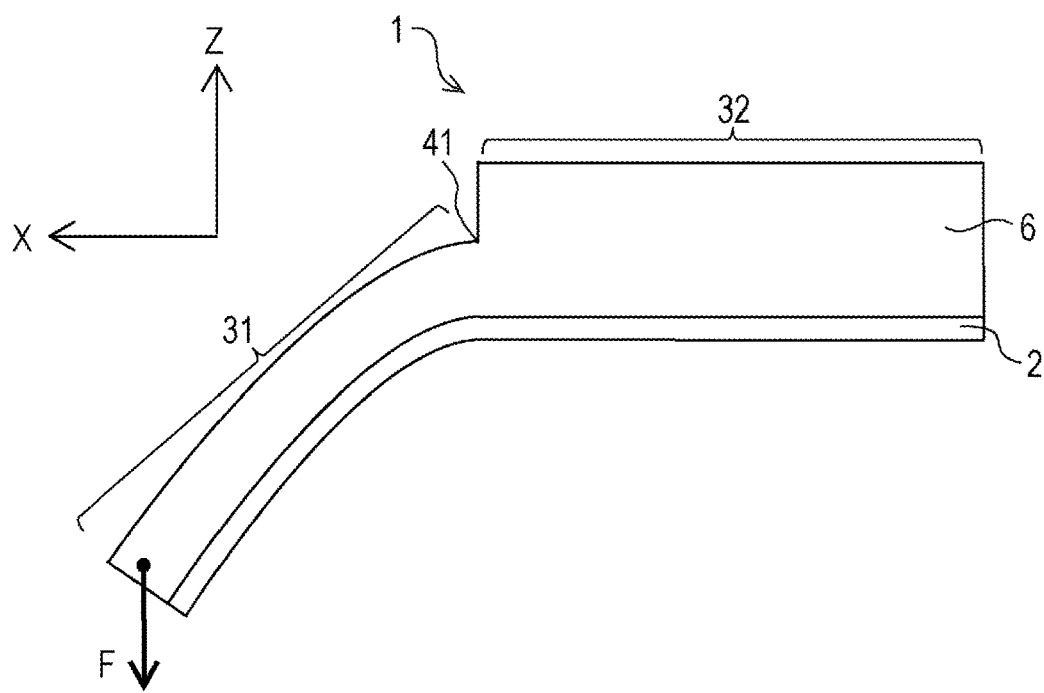
FIG. 4B is a side view of the beacon.

FIG. 4A is a perspective view of the beacon 1 and FIG. 4B is a side view of the beacon 1. FIGS. 4A and 4B illustrate a state of the beacon 1 in which an external force F in −Z direction is exerted on the first exterior section 31. In an example illustrated in FIGS. 4A and 4B, −Z direction is a direction in which a bottom surface of the substrate 2 faces and −Z direction is orthogonal to a longitudinal direction for the beacon 1. The bottom surface of the substrate 2 is a surface opposed to the top surface of the substrate 2. The level difference is formed in the boundary part between the first exterior section 31 and the second exterior section 32. When the external force F in −Z direction is exerted on the first exterior section 31, accordingly, the beacon 1 is bent in −Z direction at the boundary part between the first exterior section 31 and the second exterior section 32 as illustrated in FIG. 4B. Thus tensile stresses occur in the exterior member 6 and the stresses concentrate in a recess 41 on the exterior member 6. As a result, tears develop from the recess 41 as an origin in the boundary part between the first exterior section 31 and the second exterior section 32, so that the beacon 1 may be broken.

When the external force F in −Z direction is exerted on the second exterior section 32, the beacon 1 is bent in −Z direction at the boundary part between the first exterior section 31 and the second exterior section 32 as well. Thus tensile stresses occur in the exterior member 6 and the stresses concentrate in the recess 41 on the exterior member 6. As a result, tears develop from the recess 41 on the exterior member 6, as an origin, in the boundary part between the first exterior section 31 and the second exterior section 32, so that the beacon 1 may be broken.

Figure 5:
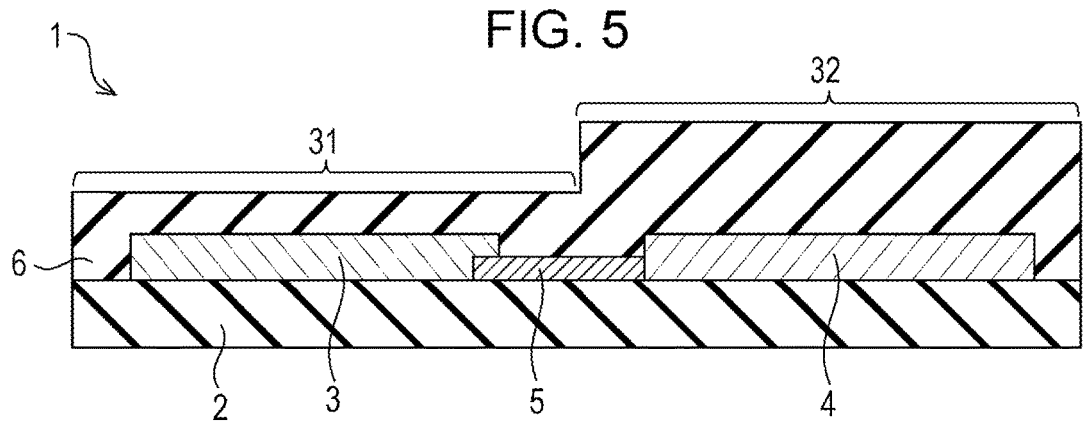
FIG. 5 is a sectional view of the beacon.

FIG. 5 is a sectional view of the beacon 1. The first exterior section 31 covers a portion of the interconnection parts 5 as well as the electronic component 3 and the second exterior section 32 covers a portion of the interconnection parts 5 as well as the electronic component 4. As illustrated in FIG. 5, the boundary part between the first exterior section 31 and the second exterior section 32 is positioned on the interconnection parts 5 and thus the interconnection parts 5 are made prone to be broken when the tears develop from the boundary part between the first exterior section 31 and the second exterior section 32. The interconnection parts 5 formed on the substrate 2 by use of the elastomer-based conductive paste or the copper foil are easier to break than the electronic components 3 and 4.

Figure 6A:
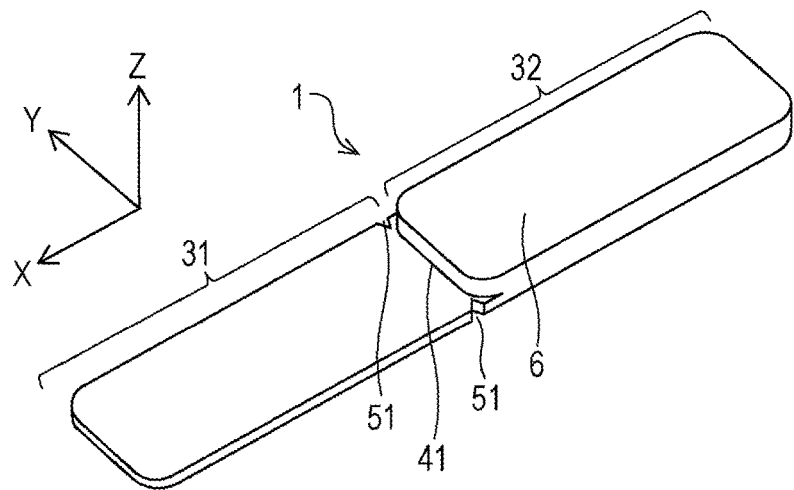
FIG. 6A is a perspective view of the beacon.
Figure 6B:
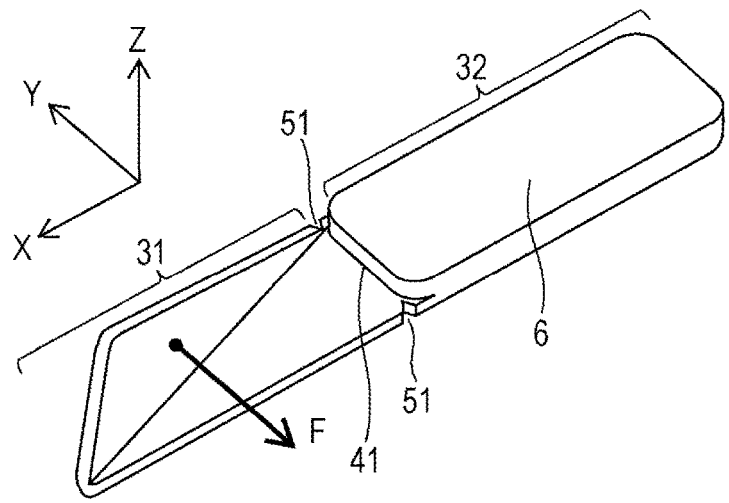
FIG. 6B is a side view of the beacon.

FIG. 6A is a perspective view of the beacon 1. As illustrated in FIG. 6A, the beacon 1 includes one notch (slit) 51 or a plurality of notches (slits) 51. Each notch 51 is a cutout in shape of a letter V, a letter U, or the like. The notch 51 is an example of the first notch. FIG. 6B illustrates a state of the beacon 1 in which an external force F in −Y direction is exerted on the first exterior section 31 to lift a part of the first exterior section 31. In an example illustrated in FIGS. 6A and 6B, −Y direction is a short direction for the beacon 1. The short direction for the beacon 1 is a direction that is coplanar with the longitudinal direction for the beacon 1 and that is orthogonal to the longitudinal direction for the beacon 1. A level difference is formed in the boundary part between the first exterior section 31 and the second exterior section 32. When the external force F in −Y direction is exerted on the first exterior section 31, accordingly, the beacon 1 is bent from the boundary part between the first exterior section 31 and the second exterior section 32 along a corner part of the beacon 1 as illustrated in FIG. 6B. Thus stresses concentrate in the recess 41 on the exterior member 6 and stresses concentrate at extremities of the notches 51. As a result, tears develop from the extremities of the notches 51, so that the beacon 1 may be broken.

When an external force F in +Y direction is exerted on the first exterior section 31, tears develop from the extremities of the notches 51, so that the beacon 1 may be broken as well. In the example illustrated in FIGS. 6A and 6B, +Y direction is the short direction for the beacon 1. When the external force F in +Y direction or −Y direction is exerted on the second exterior section 32, the tears develop from the extremities of the notches 51, so that the beacon 1 may be broken as well. Even when the beacon 1 does not include the notches 51, tears develop from the recess 41 on the exterior member 6, as an origin, in the boundary part between the first exterior section 31 and the second exterior section 32, so that the beacon 1 may be broken as well. The beacon 1 that includes the notches 51 is more prone to be broken because the stresses concentrate at the extremities of the notches 51.

Figure 7A:
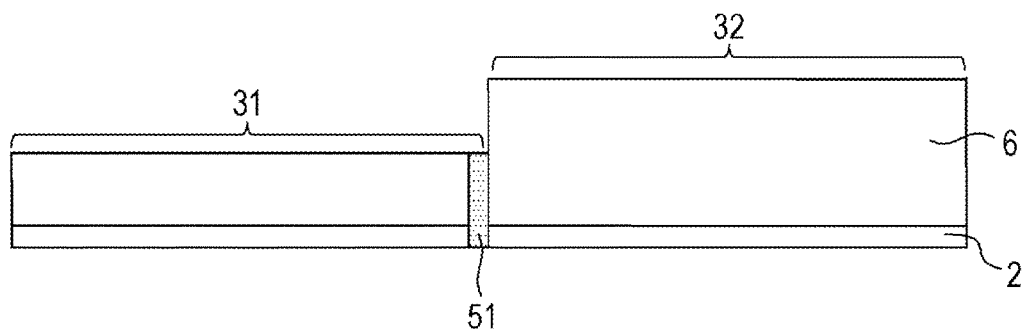
FIG. 7A is a side view of the beacon.
Figure 7B:
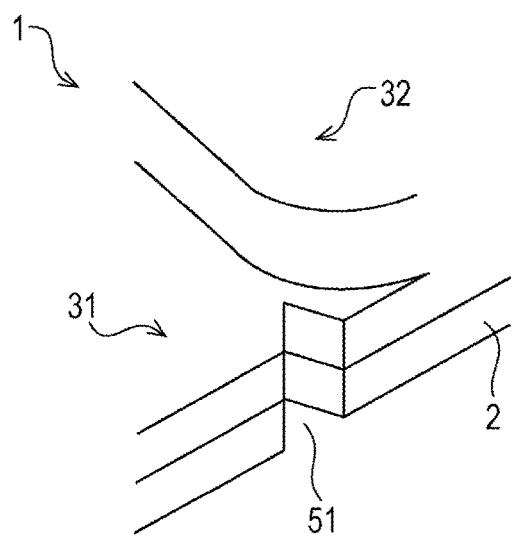
FIG. 7B is an enlarged perspective view of the beacon.
Figure 7C:
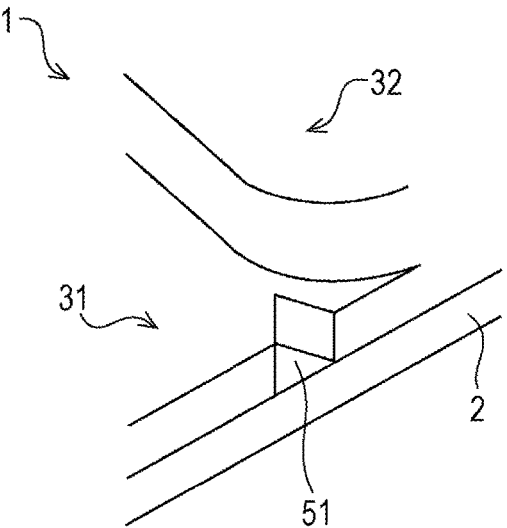
FIG. 7C is an enlarged perspective view of the beacon.

FIG. 7A is a side view of the beacon 1. As illustrated in FIG. 7A, the notch 51 is formed on a side surface of the first exterior section 31 and formed on a side surface of the substrate 2. The side surface of the first exterior section 31 is a surface orthogonal to a bottom surface of the first exterior section 31. The bottom surface of the first exterior section 31 is in contact with the top surface of the substrate 2. The side surface of the substrate 2 is a surface orthogonal to the top surface of the substrate 2. FIG. 7B is an enlarged perspective view of the beacon 1. As illustrated in FIGS. 7A and 7B, the notch 51 is adjacent to the boundary part between the first exterior section 31 and the second exterior section 32. FIG. 7C is an enlarged perspective view of the beacon 1. As illustrated in FIG. 7C, the notch 51 may be formed on the side surface of the first exterior section 31 and formation of the notch 51 on the side surface of the substrate 2 may be omitted.

An example of conditions on which the tears develop will be described below. With an energy release rate of the first exterior section 31 designated as G (N/m), tear energy in the first exterior section 31 designated as Gc (N/m), the thickness of the first exterior section 31 designated as t (m), and the external force exerted on the first exterior section 31 designated as F (N), the energy release rate is expressed as $G=2F/t$. The tears develop when the energy release rate exceeds the tear energy. That is, the tears develop from sites where the stresses concentrate when $t<2F/Gc$ hold. The inequality expression $t<2F/Gc$ is derived by substituting $2F/t$ into G in $Gc<G$. Gc is a property value that is determined in accordance with material.

When the external force F in −Y direction is exerted on the first exterior section 31 on condition that a fixing force by the fixation member 11 is greater than the external force F exerted on the first exterior section 31, the tears develop from the boundary part between the first exterior section 31 and the second exterior section 32. In the beacon 1 that includes the notches 51, the tears develop from the extremities of the notches 51. In use of bonding agent as the fixation member 11, the fixing force by the fixation member 11 is a bonding force (bonding strength) of the bonding agent. In use of pressure sensitive adhesive or adhesive compound as the fixation member 11, the fixing force by the fixation member 11 is an adhesion force (adhesive strength) of the pressure sensitive adhesive or adhesive compound.

Figure 8:
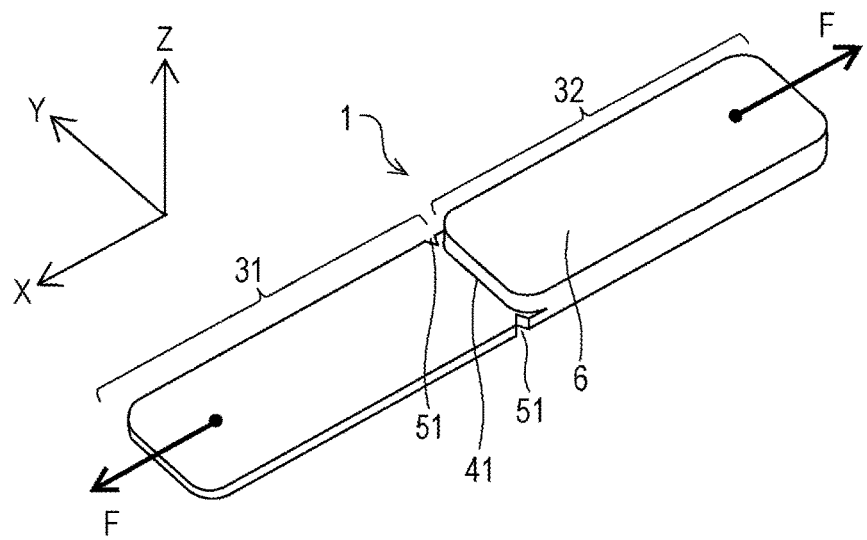
FIG. 8 is a perspective view of the beacon.

FIG. 8 is a perspective view of the beacon 1. FIG. 8 illustrates a state of the beacon 1 in which an external force F in +X direction is exerted on the first exterior section 31 and in which an external force F in −X direction is exerted on the second exterior section 32. In an example illustrated in FIG. 8, +X direction and −X direction are the longitudinal directions for the beacon 1. The level difference is formed in the boundary part between the first exterior section 31 and the second exterior section 32. When the external force in +X direction is exerted on the first exterior section 31 and when the external force in −X direction is exerted on the second exterior section 32, accordingly, tensile stresses concentrate in the recess 41 on the exterior member 6 and stresses concentrate at the extremities of the notches 51. As a result, tears develop from the extremities of the notches 51, so that the beacon 1 may be broken.

When the external force in +X direction is exerted on the first exterior section 31 or when the external force in −X direction is exerted on the second exterior section 32, tears develop from the extremities of the notches 51, so that the beacon 1 may be broken as well. Even when the beacon 1 does not include the notches 51, tears develop from the recess 41 on the exterior member 6, as an origin, in the boundary part between the first exterior section 31 and the second exterior section 32, so that the beacon 1 may be broken as well. The beacon 1 that includes the notches 51 is more prone to be broken because the tensile stresses concentrate at the extremities of the notches 51.

Figure 9A:
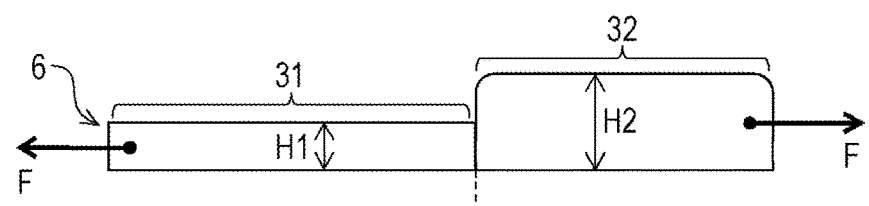
FIGS. 9A and 9B are illustrations of elongations of an exterior part.
Figure 9B:
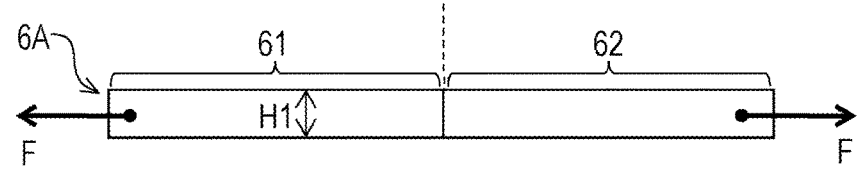

FIGS. 9A and 9B are illustrations of elongations of the exterior member 6. FIG. 9A illustrates the exterior member 6 that includes the first exterior section 31 and the second exterior section 32 and illustrates the elongation of the first exterior section 31 and the elongation of the second exterior section 32. That is, FIG. 9A illustrates the elongations of the exterior member 6 that includes the level difference. The thickness of the second exterior section 32 is greater than the thickness of the first exterior section 31. FIG. 9A illustrates a state of the exterior member 6 on which the external forces F in +X direction and in −X direction are exerted. FIG. 9B illustrates an exterior member 6A that includes exterior sections 61 and 62 having the same thickness and illustrates the elongation of the exterior section 61 and the elongation of the exterior section 62. That is, FIG. 9B illustrates the elongations of the exterior member 6A that includes no level difference. FIG. 9B illustrates a state of the exterior member 6A on which the external forces F in +X direction and in −X direction are exerted.

When the external forces F are exerted on the exterior members 6 and 6A so that the elongation of the exterior member 6 and the elongation of the exterior member 6A may be identical, the elongation of the first exterior section 31 is made larger than the elongation of the second exterior section 32 and the elongation of the exterior section 61 is made smaller than the elongation of the exterior section 62. Thus the elongation of the first exterior section 31 of the exterior member 6 having the level difference is larger than the elongation of the exterior section 61 of the exterior member 6A having no level difference. The notches 51 are preferably formed on the first exterior section 31 because the larger the elongation of the first exterior section 31 the larger the tensile stresses.

An example of conditions on which the tears develop where the notches 51 are formed on the first exterior section 31 will be described below. With the energy release rate of the first exterior section 31 designated as G (N/m), the tear energy in the first exterior section 31 designated as Gc (N/m), a depth of the notches 51 designated as c (m), strain energy designated as W, and a numerical constant (function of elongation ratio) designated as k, the energy release rate is expressed as G=2 kcW. The tears develop when the energy release rate exceeds the tear energy. That is, the tears develop from the extremities of the notches 51 when c>Gc/2 kW hold. The inequality expression c>Gc/2 kw is derived by substituting 2 kcW into G in Gc<G.

Figure 10A:
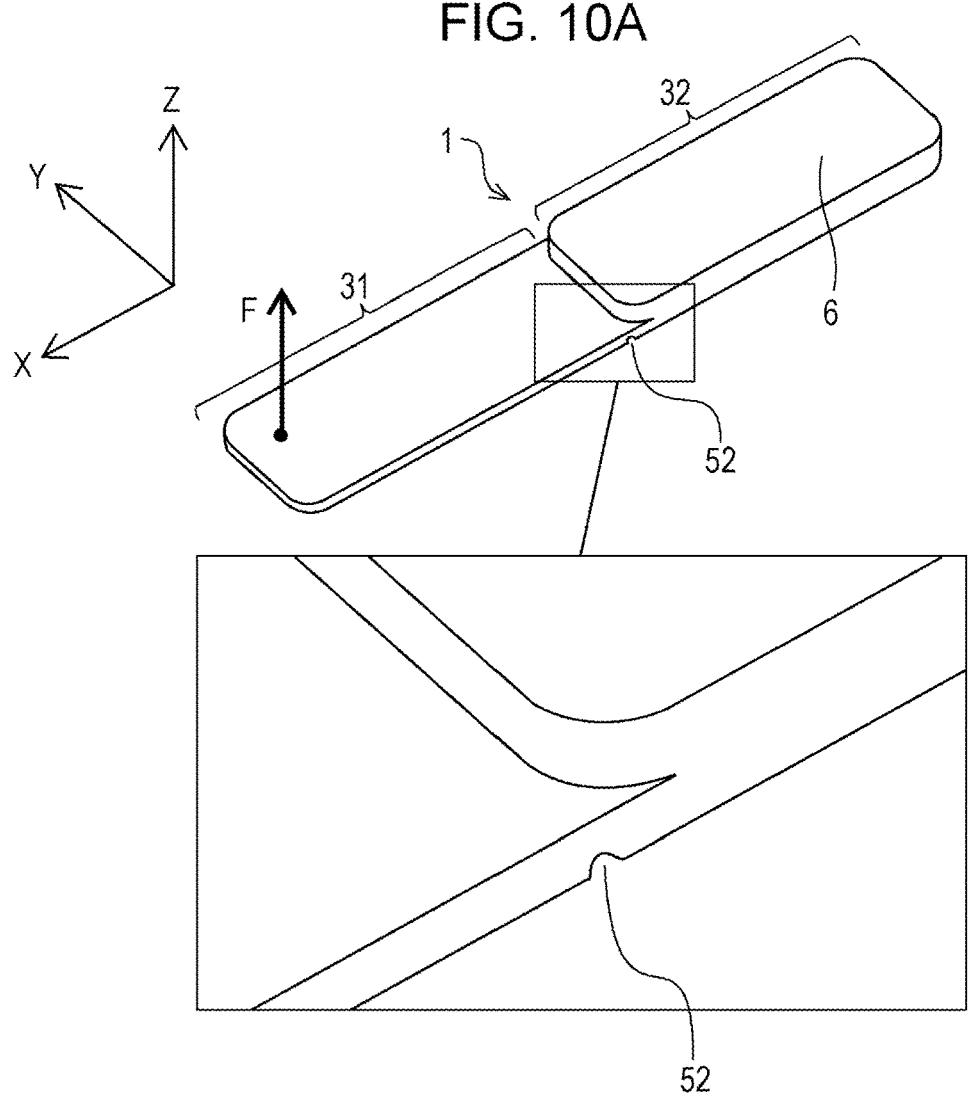
FIG. 10A is a perspective view of the beacon.
Figure 10B:
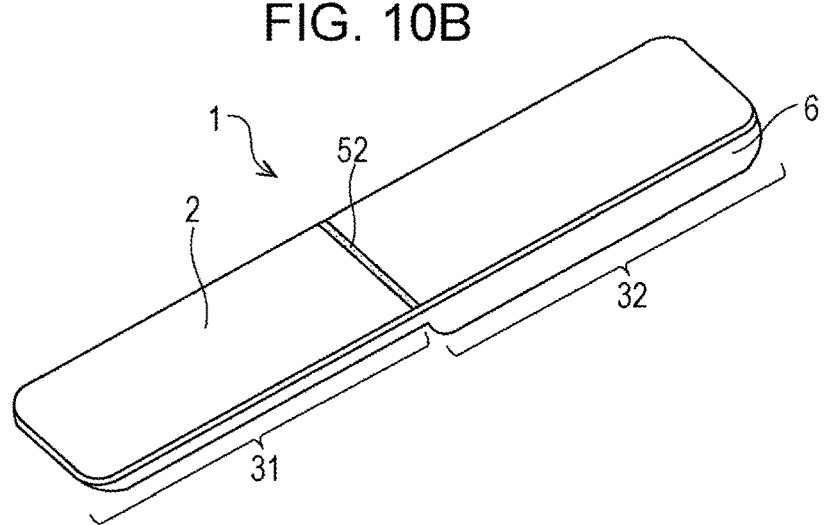
FIG. 10B is a perspective view of the beacon.

FIG. 10A is a perspective view of the beacon 1. FIG. 10B is a perspective view of the beacon 1 as seen looking from a bottom surface side of the substrate 2. As illustrated in FIGS. 10A and 10B, the beacon 1 includes a groove 52. The groove 52 is an example of the first groove. The groove 52 is formed on the bottom surface of the substrate 2. In plan view from the bottom surface side of the substrate 2, the groove 52 linearly extends from the side surface of the substrate 2 on one side to the side surface of the substrate 2 on an opposite side. At least a portion of the boundary part between the first exterior section 31 and the second exterior section 32 lies over at least a portion of the groove 52 in plan view.

FIG. 10A illustrates a state of the beacon 1 in which an external force F in +Z direction is exerted on the first exterior section 31. In an example illustrated in FIG. 10A, +Z direction is a direction which is orthogonal to the longitudinal direction for the beacon 1 and in which the top surface of the substrate 2 faces. A level difference is formed in the boundary part between the first exterior section 31 and the second exterior section 32. When the external force F in +Z direction is exerted on the first exterior section 31, accordingly, the beacon 1 is bent in +Z direction at the boundary part between the first exterior section 31 and the second exterior section 32. Such a bend of the beacon 1 in +Z direction causes tensile stresses in the substrate 2 and makes stresses concentrate in the groove 52. As a result, tears develop from the groove 52, so that the beacon 1 may be broken. When the external force in +Z direction is exerted on the second exterior section 32, tears develop from the groove 52, so that the beacon 1 may be broken as well.

<Second Embodiment>

Figure 11A:
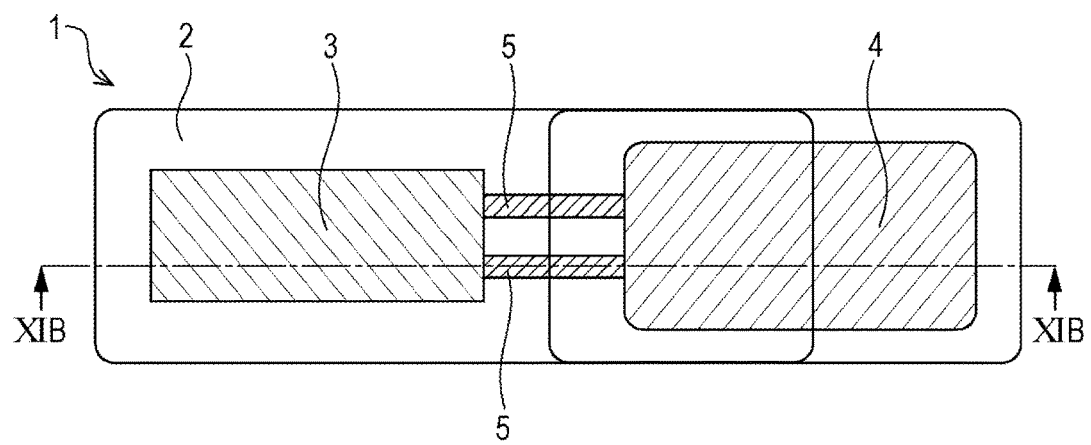
FIG. 11A is a plan view of the beacon.
Figure 11B:
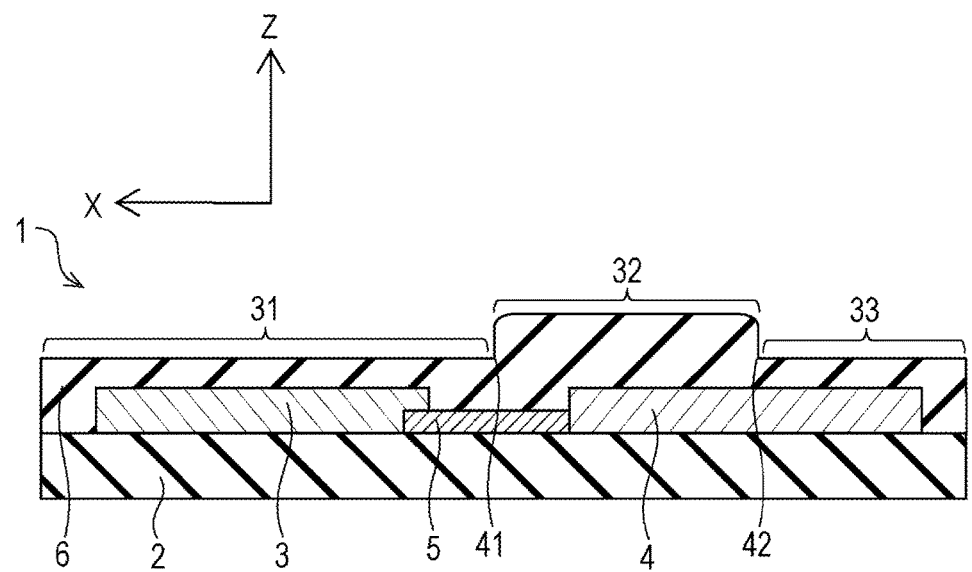
FIG. 11B is a sectional view of the beacon.

The second embodiment will be described below. FIG. 11A is a plan view of the beacon 1. FIG. 11B is a sectional view of the beacon 1 and illustrates a section taken along a long dashed short dashed line XIB-XIB in FIG. 11A. The exterior member 6 of the beacon 1 illustrated in FIGS. 11A and 11B includes the first exterior section 31, the second exterior section 32, and a third exterior section 33. The thickness of the first exterior section 31 is different from the thickness of the second exterior section 32 and the thickness of the second exterior section 32 is greater than the thickness of the first exterior section 31. Therefore, a level difference is formed in the boundary part between the first exterior section 31 and the second exterior section 32. The thickness of the second exterior section 32 is different from a thickness of the third exterior section 33 and the thickness of the second exterior section 32 is greater than the thickness of the third exterior section 33. Therefore, a level difference is formed in a boundary part between the second exterior section 32 and the third exterior section 33.

The stiffness of the first exterior section 31 and a stiffness of the third exterior section 33 are relatively small and thus the first exterior section 31 and the third exterior section 33 are more prone to be deformed than the second exterior section 32. The stiffness of the second exterior section 32 is relatively large and thus the second exterior section 32 is more resistant to deformation than the first exterior section 31 and the third exterior section 33. The thickness of the first exterior section 31 may be different from the thickness of the third exterior section 33 or the thickness of the first exterior section 31 may be identical to the thickness of the third exterior section 33.

The level difference is formed in the boundary part between the first exterior section 31 and the second exterior section 32. When the external force F in −Z direction is exerted on the first exterior section 31, for instance, the beacon 1 is bent at the boundary part between the first exterior section 31 and the second exterior section 32. Thus tensile stresses occur in the exterior member 6 and stresses concentrate in the recess 41 on the exterior member 6. As a result, tears develop from the recess 41 on the exterior member 6, as an origin, in the boundary part between the first exterior section 31 and the second exterior section 32, so that the beacon 1 may be broken. When the external force F in −Z direction is exerted on the third exterior section 33, for instance, the beacon 1 is bent at the boundary part between the second exterior section 32 and the third exterior section 33. Thus tensile stresses occur in the exterior member 6 and stresses concentrate in a recess 42 on the exterior member 6. As a result, tears develop from the recess 42 on the exterior member 6, as an origin, in the boundary part between the second exterior section 32 and the third exterior section 33, so that the beacon 1 may be broken. The beacon 1 illustrated in FIGS. 11A and 11B includes tow level differences, for example, and thus sites where the stresses concentrate increase in number so that reliability of a break in the beacon 1 is increased.

<Third Embodiment>

Figure 12A:
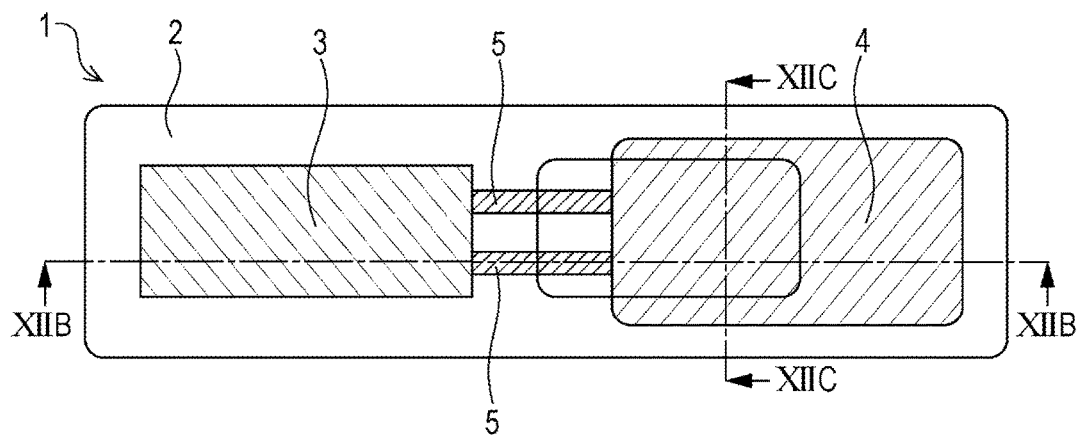
FIG. 12A is a plan view of the beacon.
Figure 12B:
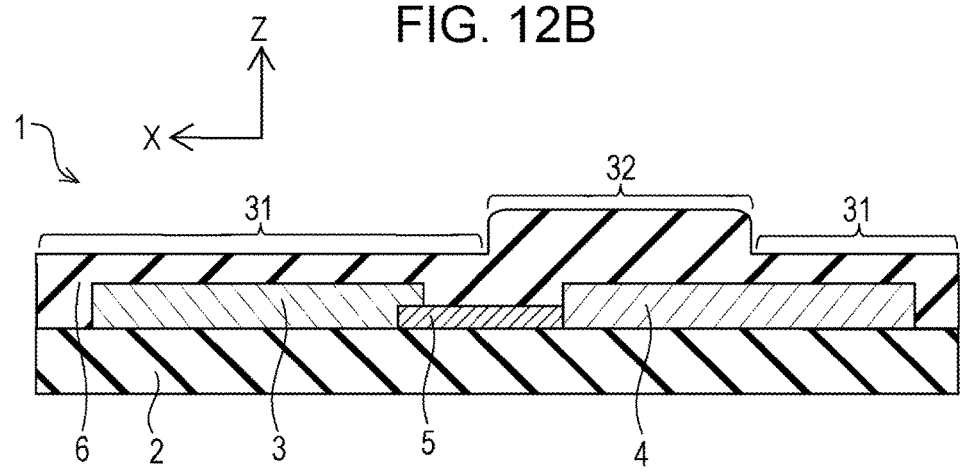
FIG. 12B is a sectional view of the beacon.
Figure 12C:
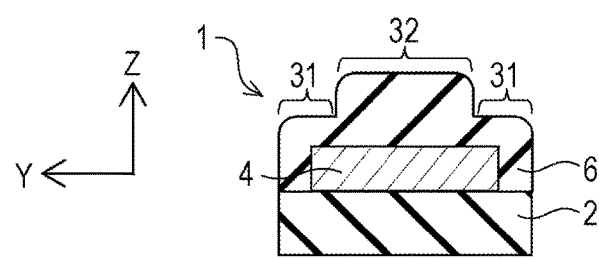
FIG. 12C is a sectional view of the beacon.

A third embodiment will be described below. FIG. 12A is a plan view of the beacon 1. FIG. 12B is a sectional view of the beacon 1 and illustrates a section taken along a long dashed short dashed line XIIB-XIIB in FIG. 12A. FIG. 12C is a sectional view of the beacon 1 and illustrates a section taken along a long dashed short dashed line XIIC-XIIC in FIG. 12A. The exterior member 6 of the beacon 1 illustrated in FIGS. 12A to 12C includes the first exterior section 31 and the second exterior section 32. The thickness of the first exterior section 31 is different from the thickness of the second exterior section 32 and the thickness of the second exterior section 32 is greater than the thickness of the first exterior section 31. Therefore, a level difference is formed in the boundary part between the first exterior section 31 and the second exterior section 32. The stiffness of the first exterior section 31 is relatively small and thus the first exterior section 31 is more prone to be deformed than the second exterior section 32. The stiffness of the second exterior section 32 is relatively large and thus the second exterior section 32 is more resistant to deformation than the first exterior section 31.

The first exterior section 31 covers an outer peripheral portion of the substrate 2 in plan view and the second exterior section 32 covers a portion of the substrate 2 that is inside the outer peripheral portion in plan view. That is, the second exterior section 32 is surrounded by the first exterior section 31 in plan view. In the beacon 1 illustrated in FIGS.

12A to 12C, accordingly, rectangular or circular formation of the level difference increases a number of the sites where the stresses concentrate and increases the reliability of the break in the beacon 1.

<Fourth Embodiment>

Figure 13A:
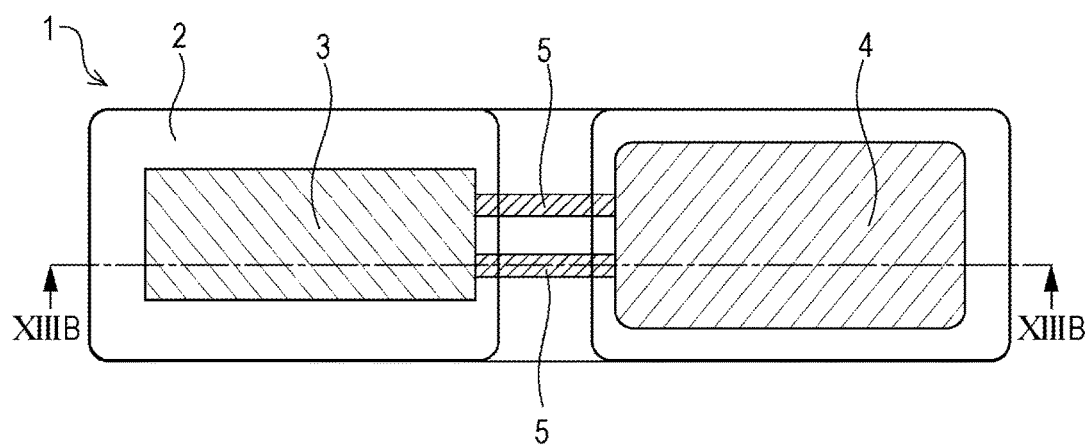
FIG. 13A is a plan view of the beacon.
Figure 13B:
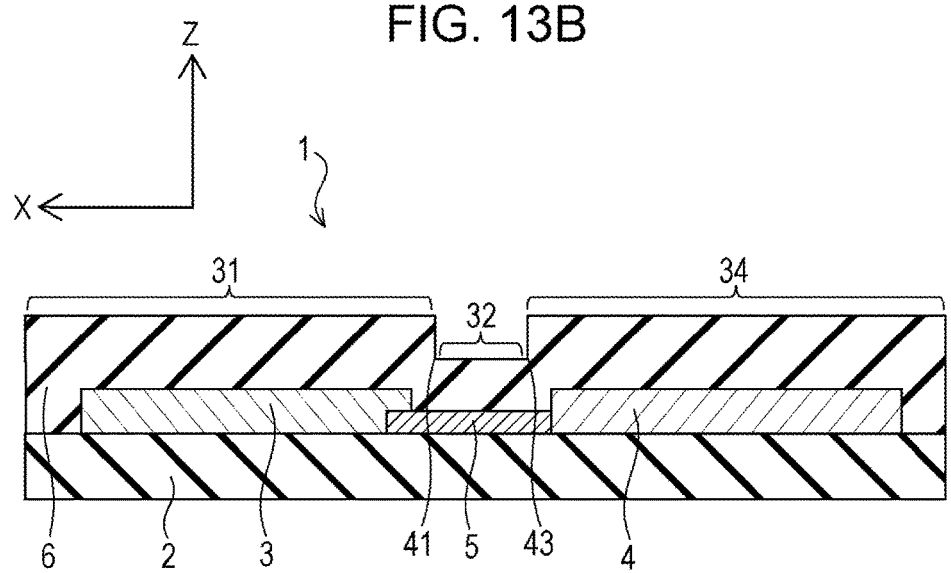
FIG. 13B is a sectional view of the beacon.

A fourth embodiment will be described below. FIG. 13A is a plan view of the beacon 1. FIG. 13B is a sectional view of the beacon 1 and illustrates a section taken along a long dashed short dashed line XIIIB-XIIIB in FIG. 13A. The exterior member 6 of the beacon 1 illustrated in FIGS. 13A and 13B includes the first exterior section 31, the second exterior section 32, and a fourth exterior section 34. The thickness of the first exterior section 31 is different from the thickness of the second exterior section 32 and the thickness of the first exterior section 31 is greater than the thickness of the second exterior section 32. Therefore, a level difference is formed in the boundary part between the first exterior section 31 and the second exterior section 32. The thickness of the second exterior section 32 is different from a thickness of the fourth exterior section 34 and the thickness of the fourth exterior section 34 is greater than the thickness of the second exterior section 32. Therefore, a level difference is formed in a boundary part between the second exterior section 32 and the fourth exterior section 34.

The stiffness of the second exterior section 32 is relatively small and thus the second exterior section 32 is more prone to be deformed than the first exterior section 31 and the fourth exterior section 34. The stiffness of the first exterior section 31 and a stiffness of the fourth exterior section 34 are relatively large and thus the first exterior section 31 and the fourth exterior section 34 are more resistant to deformation than the second exterior section 32. The thickness of the first exterior section 31 may be different from the thickness of the fourth exterior section 34 or the thickness of the first exterior section 31 may be identical to the thickness of the fourth exterior section 34.

The level difference is formed in the boundary part between the first exterior section 31 and the second exterior section 32. When the external force F in −Z direction is exerted on the first exterior section 31, for instance, the beacon 1 is bent at the boundary part between the first exterior section 31 and the second exterior section 32. Thus tensile stresses occur in the exterior member 6 and stresses concentrate in the recess 41 on the exterior member 6. As a result, tears develop from the recess 41 on the exterior member 6, as an origin, in the boundary part between the first exterior section 31 and the second exterior section 32, so that the beacon 1 may be broken.

The level difference is formed in the boundary part between the second exterior section 32 and the fourth exterior section 34. When the external force F in −Z direction is exerted on the fourth exterior section 34, for instance, the beacon 1 is bent at the boundary part between the second exterior section 32 and the fourth exterior section 34. Thus tensile stresses occur in the exterior member 6 and stresses concentrate in a recess 43 on the exterior member 6. As a result, tears develop from the recess 43 on the exterior member 6, as an origin, in the boundary part between the second exterior section 32 and the fourth exterior section 34, so that the beacon 1 may be broken. The beacon 1 illustrated in FIGS. 13A and 13B includes the plurality of level differences and thus sites where the stresses concentrate increase in number so that the reliability of a break in the beacon 1 is increased.

<Fifth Embodiment>

Figure 14A:
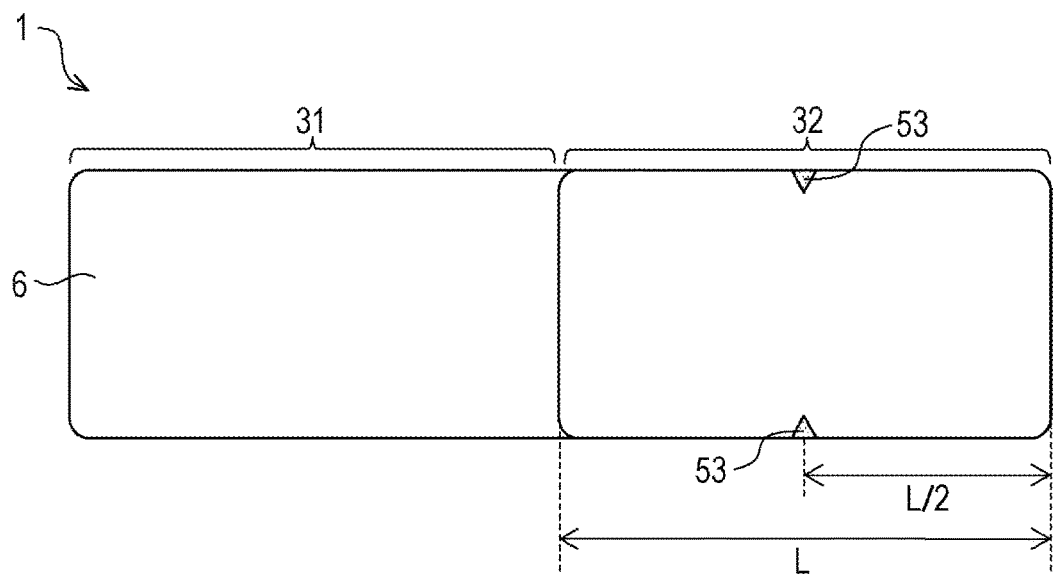
FIG. 14A is a plan view of the beacon.
Figure 14B:
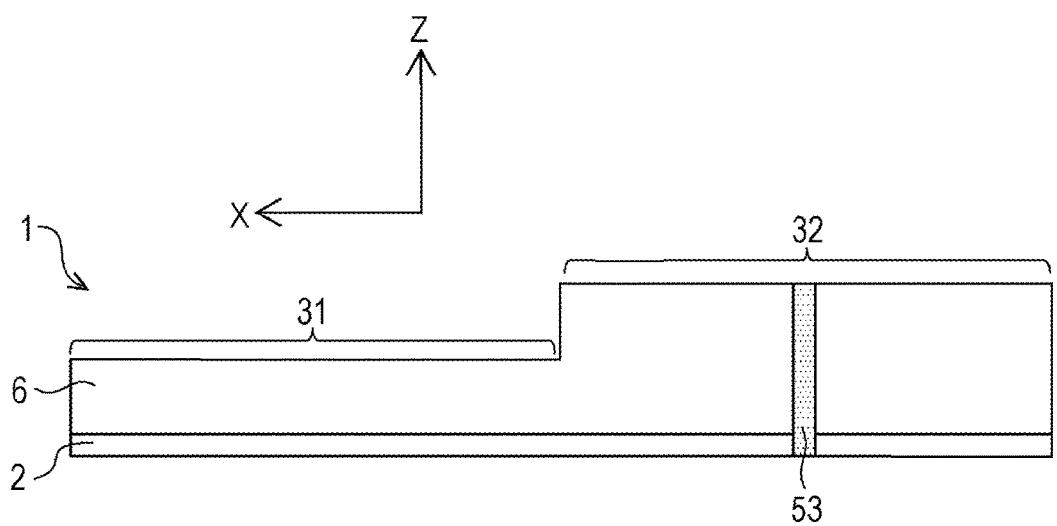
FIG. 14B is a side view of the beacon.

A fifth embodiment will be described below. FIG. 14A is a plan view of the beacon 1. FIG. 14B is a side view of the beacon 1. The beacon 1 includes one notch (slit) 53 or a plurality of notches (slits) 53. Each notch 53 is a cutout in shape of a letter V, a letter U, or the like. The notch 53 is an example of the second notch. The notches 53 are formed on side surfaces of the second exterior section 32 and formed on the side surfaces of the substrate 2. The side surfaces of the second exterior section 32 are surfaces orthogonal to a bottom surface of the second exterior section 32. The bottom surface of the second exterior section 32 is in contact with the top surface of the substrate 2. The second exterior section 32 is in shape of a general quadrangle in plan view and the notches 53 are formed on the second exterior section 32 and the substrate 2 so as to extend through a midpoint of at least one side of the general quadrangle. When the external force F in +Z direction or −Z direction is exerted on the second exterior section 32, for instance, stresses concentrate at extremities of the notches 53. As a result, tears develop from the extremities of the notches 53, so that the beacon 1 may be broken.

Figure 15A:
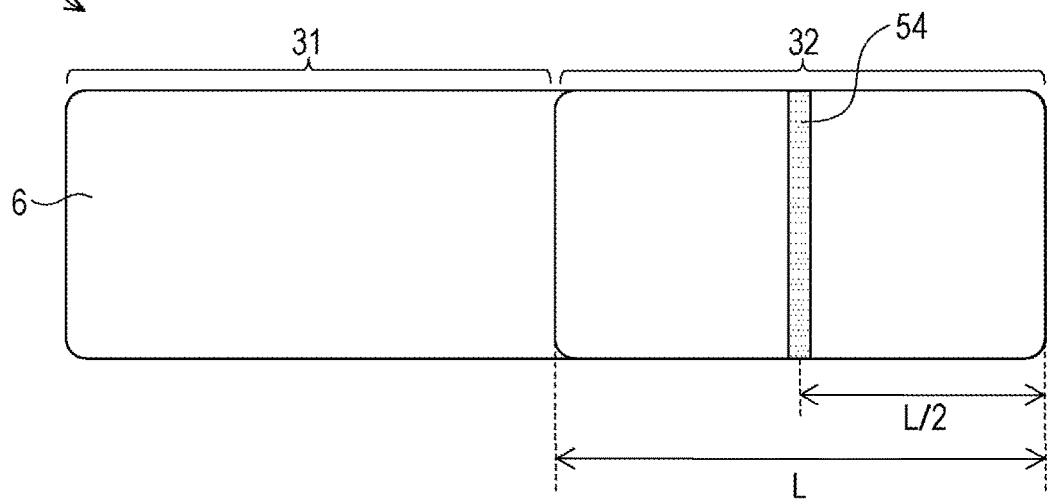
FIG. 15A is a plan view of the beacon.
Figure 15B:
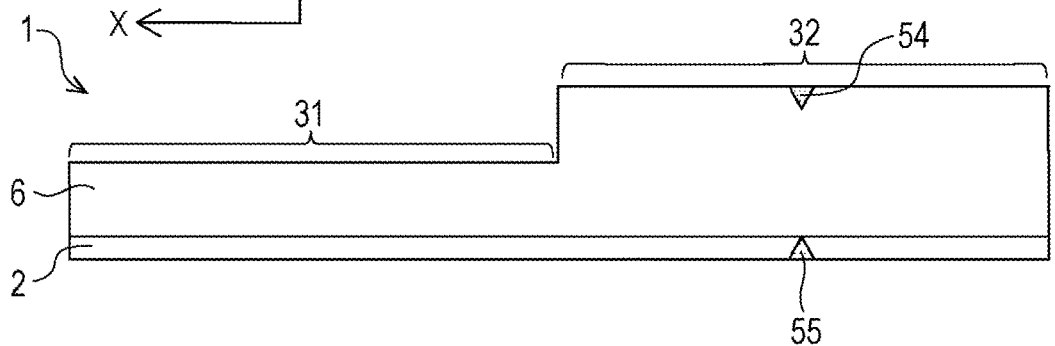
FIG. 15B is a side view of the beacon.

FIG. 15A is a plan view of the beacon 1. FIG. 15B is a side view of the beacon 1. The beacon 1 includes one groove 54 or a plurality of grooves 54. The groove 54 is an example of the second groove. The beacon 1 includes one groove 55 or a plurality of grooves 55. In an example illustrated in FIGS. 15A and 15B, the groove 54 is formed on a top surface of the second exterior section 32 and the groove 55 is formed on the bottom surface of the substrate 2. The top surface of the second exterior section 32 is a surface opposed to the bottom surface of the second exterior section 32. The second exterior section 32 is in shape of the general quadrangle in plan view and the groove 54 is formed so as to link midpoints of at least one pair of opposite sides of the general quadrangle. The substrate 2 is in shape of a general quadrangle in plan view and the groove 55 is formed so as to link midpoints of at least one pair of opposite sides of the quadrangle. In the example illustrated in FIGS. 15A and 15B, the groove 55 lies over the groove 54 in plan view.

When the external force F in −Z direction is exerted on the second exterior section 32, for instance, tensile stresses occur in the second exterior section 32 and stresses concentrate in the groove 54. As a result, tears develop from the groove 54, so that the beacon 1 may be broken. When the external force F in +Z direction is exerted on the second exterior section 32, for instance, tensile stresses occur in the substrate 2 and stresses concentrate in the groove 55. As a result, tears develop from the groove 55, so that the beacon 1 may be broken.

The second exterior section 32 is in shape of the general quadrangle in plan view. One groove 54 may be formed so as to link midpoints of one pair of opposite sides of the general quadrangle and the other groove 54 may be formed so as to link midpoints of the other pair of opposite sides of the general quadrangle. The substrate 2 is in shape of the general quadrangle in plan view. One groove 55 may be formed so as to link midpoints of one pair of opposite sides of the general quadrangle and the other groove 55 may be formed so as to link midpoints of the other pair of opposite sides of the general quadrangle.

Figure 16:
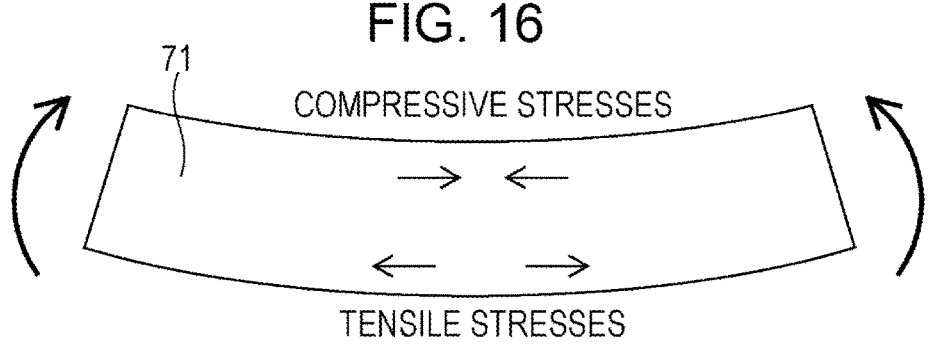
FIG. 16 is an illustration of stresses exerted on material.

FIG. 16 is an illustration of stresses exerted on material 71. When a bending moment is exerted on the material 71 as illustrated in FIG. 16, compressive stresses are exerted on an inner side of a bend of the material 71 and tensile stresses are exerted on an outer side of the bend of the material 71. When a plurality of materials 71 having different thicknesses are similarly deformed, the larger the thickness of the material 71 the larger the tensile stresses. Then the tensile stresses become the largest at center of the material 71. Therefore, the notches 53, the grooves 54, and/or the like are preferably formed at center of the second exterior section 32.

According to the first to fifth embodiments, formation of the level difference in the boundary part between the first exterior section 31 and the second exterior section 32 leads to confinement of sites to be deformed in the beacon 1 and concentration of the stresses in specified parts of the beacon 1, so that the beacon 1 is made easy to break. Thus the beacon 1 is made prone to be broken when being detached from an installation location, so that theft of the beacon 1 and tampering with the installation location are inhibited.

In the first to fifth embodiments, a mounting position of the electronic component 3 and a mounting position of the electronic component 4 may be interchanged. In such a case, the electronic component 3 is an example of the second component and the electronic component 4 is an example of the first component. Though the beacon 1 has been described for the first to fifth embodiments, the first to fifth embodiments may be applied to such electronic equipment as radio frequency identification (RFID) tag and other communication devices. The above embodiments may be combined. For instance, the beacon 1 according to the second to fifth embodiments may include the one notch 51 or the plurality of notches 51. The beacon 1 according to the second to fifth embodiments may include the groove 52, for instance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic equipment comprising:
    a substrate configured to include a first component, a second component, and an interconnection part that couples the first component with the second component by electric interconnections; and
    an exterior part configured to cover the first component, the second component, and the interconnection parts, and include
    a first exterior section that covers at least a portion of the first component, and
    a second exterior section that covers at least a portion of the interconnection parts, a thickness of the first exterior section being different from a thickness of the second exterior section to form a level difference in a boundary part between the first exterior section and the second exterior section, wherein
    the thickness of the second exterior section is greater than the thickness of the first exterior section,
    the thickness t of the first exterior section, an external force F exerted on the first exterior section, and tear energy Gc in the first exterior section satisfy an expression $t<2F/Gc$, and
    a fixing force that fixes at least either of the substrate and the exterior part is equal to or greater than the external force F.

2. The electronic equipment according to claim 1, wherein a material of the substrate and the exterior part comprises elastomer.

3. The electronic equipment according to claim 1, wherein a first notch adjacent to the boundary part between the first exterior section and the second exterior section is formed on a side surface of the first exterior section.

4. The electronic equipment according to claim 1, wherein
    the substrate includes a first surface on which the first component and the second component are mounted and a second surface which is opposed to the first surface,
    a first groove is formed on the second surface, and
    at least a portion of the boundary part between the first exterior section and the second exterior section lies over at least a portion of the first groove in plan view.

5. The electronic equipment according to claim 1, wherein
    a thickness of the second exterior section is greater than a thickness of the first exterior section, and
    the second exterior section is in shape of a quadrangle in plan view and a second notch is formed on a side surface of the second exterior section so as to extend through a midpoint of at least one side of the quadrangle.

6. The electronic equipment according to claim 1, wherein
    the thickness of the second exterior section is greater than the thickness of the first exterior section, and
    the second exterior section is in shape of the quadrangle in plan view and a second groove is formed on the second exterior section so as to link midpoints of at least one pair of opposite sides of the quadrangle.

7. The electronic equipment according to claim 1, wherein
    the exterior part further includes a third exterior section that covers a portion of the second component,
    the thickness of the second exterior section is different from a thickness of the third exterior section, and
    a level difference is formed in a boundary part between the second exterior section and the third exterior section.

8. The electronic equipment according to claim 1, wherein
    the first exterior section covers an outer peripheral portion of the substrate in plan view, and
    the second exterior section covers a portion of the substrate that is inside the outer peripheral portion in plan view.

9. The electronic equipment according to claim 1, wherein
    the exterior part further includes a fourth exterior section that covers at least a portion of the second component and a portion of the interconnection parts,
    the thickness of the second exterior section is different from a thickness of the fourth exterior section, and
    a level difference is formed in a boundary part between the second exterior section and the fourth exterior section.

10. The electronic equipment according to claim 1, wherein
    the first exterior section covers at least a portion of the first component and a first portion of the interconnection parts,
    the second exterior section covers at least a portion of the second component and a second portion of the interconnection parts, and
    the boundary part between the first exterior section and the second exterior section lies over a portion of the interconnection parts in plan view.

11. The electronic equipment according to claim 1, wherein the first component is a solar cell that supplies electric power to the second component.

12. A beacon comprising:
    a substrate configured to include a first component, a second component, and an interconnection part that couples the first component with the second component by electric interconnections; and an exterior part configured to cover the first component, the second component, and the interconnection parts, and include a first exterior section that covers at least a portion of the first component, and a second exterior section that covers at least a portion of the interconnection parts, a thickness of the first exterior section being different from a thickness of the second exterior section to form a level difference in a boundary part between the first exterior section and the second exterior section, wherein the thickness of the second exterior section is greater than the thickness of the first exterior section, the thickness t of the first exterior section, an external force F exerted on the first exterior section, and tear enemy Gc in the first exterior section satisfy an expression $t<2F/Gc$, and a fixing force that fixes at least either of the substrate and the exterior part is equal to or greater than the external force F.

* * * * *